(12) United States Patent
Mock et al.

(10) Patent No.: US 12,128,373 B2
(45) Date of Patent: Oct. 29, 2024

(54) 3D BEATER

(71) Applicant: WHIRLPOOL CORPORATION, Benton Harbor, MI (US)

(72) Inventors: Brandon T. Mock, St. Joseph, MI (US); Sayer James Murphy, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 235 days.

(21) Appl. No.: 17/568,021

(22) Filed: Jan. 4, 2022

(65) Prior Publication Data

US 2023/0211299 A1 Jul. 6, 2023

(51) Int. Cl.
| | |
|---|---|
| *B01F 27/95* | (2022.01) |
| *A47J 43/044* | (2006.01) |
| *A47J 43/07* | (2006.01) |
| *B01F 27/072* | (2022.01) |
| *B01F 27/091* | (2022.01) |
| *B01F 27/093* | (2022.01) |
| *B01F 27/13* | (2022.01) |

(Continued)

(52) U.S. Cl.
CPC ............. *B01F 27/95* (2022.01); *A47J 43/044* (2013.01); *A47J 43/0711* (2013.01); *B01F 27/0723* (2022.01); *B01F 27/091* (2022.01); *B01F 27/093* (2022.01); *B01F 27/13* (2022.01); *B01F 27/2121* (2022.01); *A47J 2043/04481* (2013.01); *B01F 2101/1805* (2022.01)

(58) Field of Classification Search
CPC ...... B01F 27/95; B01F 27/2121; B01F 27/13; B01F 27/093; B01F 27/0723; A47J 43/044; A47J 43/0711; A47J 2043/04481; A47J 2043/0449

See application file for complete search history.

(56) References Cited

U.S. PATENT DOCUMENTS

| | | | | |
|---|---|---|---|---|
| 100,155 A | * | 2/1870 | Krandelt | ............. B01F 27/95 366/288 |
| RE15,746 E | * | 1/1924 | Westerman | ............. B01F 27/95 366/287 |

(Continued)

FOREIGN PATENT DOCUMENTS

| | | | |
|---|---|---|---|
| CN | 104959057 A | * | 10/2015 |
| CN | 106582384 A | * | 4/2017 |

(Continued)

*Primary Examiner* — Marc C Howell
*Assistant Examiner* — Patrick M McCarty
(74) *Attorney, Agent, or Firm* — PRICE HENEVELD LLP

(57) ABSTRACT

A mixer for combining food constituents into a homogeneous mass includes an eccentric drive mounted on a mixing head of the mixer, where the eccentric drive is configured to rotate around a central axis of a mixing area and rotate an offset rotational axis of a drive shaft in an orbit about the central axis of the mixing area. An angled beater attachment for the mixer further includes a top mounting portion operably coupled to the drive shaft of the stand mixer, a bottom beater portion disposed above the mixing area, and a beater support member operably coupled with a support shaft of the bottom beater portion. The bottom beater portion is driven by the drive shaft about an angled rotational axis that extends at an acute angle relative to the central axis of the mixing area.

19 Claims, 10 Drawing Sheets

(51) Int. Cl.
    *B01F 27/2121* (2022.01)
    *B01F 101/00* (2022.01)

(56) References Cited

U.S. PATENT DOCUMENTS

| | | | | |
|---|---|---|---|---|
| 1,908,153 | A | * | 5/1933 | Meeker ............... A21C 1/147 |
| | | | | 74/606 R |
| 2,109,614 | A | * | 3/1938 | Dehuff ............... A21C 1/1405 |
| | | | | 416/227 R |
| 2,265,533 | A | * | 12/1941 | Lawrence ........... A47J 43/1025 |
| | | | | 366/247 |
| 4,023,780 | A | | 5/1977 | Egid |
| 4,131,034 | A | * | 12/1978 | Rolf ................... A47J 43/044 |
| | | | | 475/11 |
| 4,176,971 | A | | 12/1979 | Emster et al. |
| 4,311,397 | A | * | 1/1982 | Wright ............... B01F 27/1142 |
| | | | | 366/98 |
| 5,000,578 | A | | 3/1991 | Artin et al. |
| 6,652,137 | B1 | | 11/2003 | Bosch et al. |
| D664,807 | S | * | 8/2012 | Annis ........................ D7/378 |
| D848,215 | S | * | 5/2019 | Chen ......................... D7/412 |
| 10,660,476 | B2 | | 5/2020 | Jin |
| 2001/0040838 | A1 | | 11/2001 | Buchsteiner et al. |
| 2012/0081993 | A1 | | 4/2012 | Annis et al. |
| 2021/0282597 | A1 | | 9/2021 | Lin |

FOREIGN PATENT DOCUMENTS

| | | | |
|---|---|---|---|
| CN | 210493818 | | 5/2020 |
| EP | 1967105 | | 9/2008 |
| EP | 2675330 | | 3/2015 |
| GB | 323132 A | * | 12/1929 |
| GB | 2453546 | | 4/2009 |
| GB | 2548082 | | 9/2017 |
| WO | 2011144820 | | 11/2011 |
| WO | 2018036780 | | 3/2018 |

* cited by examiner

3D BEATER

BACKGROUND OF THE DISCLOSURE

The present disclosure generally relates to a mixer for combining food constituents into a homogeneous mass, and in particular relates to a mixer including an angled beater attachment having a bottom beater portion driven by a drive shaft about an angled rotational axis that extends at an acute angle relative to a central axis of the mixing area.

SUMMARY OF THE DISCLOSURE

One aspect of the present disclosure is a mixer for combining food constituents into a homogeneous mass that includes an eccentric drive mounted on a mixing head of the mixer, where the eccentric drive is configured to rotate around a central axis of a mixing area and rotate an offset rotational axis of a drive shaft in an orbit about the central axis of the mixing area. An angled beater attachment for the mixer includes a top mounting portion operably coupled to the drive shaft of the stand mixer, a bottom beater portion disposed above the mixing area, and a beater support member operably coupled with a support shaft of the bottom beater portion. The bottom beater portion is driven by the drive shaft about an angled rotational axis that extends at an acute angle relative to the central axis of the mixing area.

Additional features of this aspect may include the top mounting portion of the angled beater attachment orbits the central axis. The top mounting portion may be operably coupled to the drive shaft of the mixer by a releasable connector disposed on the top mounting portion. The angled beater attachment may include an articulating U-joint that operably couples the top mounting portion and the bottom beater portion and pivots about the offset rotational axis of the drive shaft and about the angled rotational axis. The beater support member may be operably coupled with an attachment drive lug disposed on the eccentric drive at an upper end of the beater support member and operably coupled with the support shaft of the bottom beater portion at a lower end of the beater support member. The beater support member may rotate about the central axis and the offset rotational axis of the drive shaft and the offset rotational axis of the top mounting portion may be coincident and the top mounting portion may rotate about the offset rotational axis of the drive shaft and orbits the central axis of the mixing area. The bottom beater portion may include a mixing element having a curvilinear leading edge adapted to engage a smooth curvature of the bottom interior surface of a mixing bowl. The bottom beater portion may include a trailing edge operably coupled with the leading edge, such that the leading edge and the trailing edge define a leading edge closed loop having a substantially triangular cross-section. A bottom tail of the trailing edge may have a curvilinear configuration and extend away from the leading edge of the bottom beater portion. An upper arm of the leading edge may extend outwardly from the support shaft of the bottom beater portion. The bottom beater portion may include a mixing element having a curvilinear leading edge, the leading edge further comprising a forward extending blade adapted to engage a smooth curvature of the bottom interior surface of a mixing bowl. The bottom beater portion may include a beater frame operably coupled with the leading edge, the beater frame comprising a forward leg, an upper leg operably coupled with the top mounting portion, a rearward leg, and a bottom leg that define a beater frame closed loop having a substantially triangular cross-section. The bottom leg of the beater frame may have an offset raised central portion. The leading edge and the forward leg of the beater frame may define a leading edge closed loop having an upwardly extending leg operably coupling an upper portion of the leading edge with the beater frame, the upwardly extending leg having a substantially triangular cross-section.

An additional aspect of the present disclosure is an angled beater attachment for a stand mixer having an eccentric drive rotatable about a central axis of a mixing area. The angled beater attachment may include a top mounting portion operably coupled to an offset drive shaft of the stand mixer, a bottom beater portion centrally disposed above the mixing area, the bottom beater portion having an upwardly extending support shaft. and a beater support member operably coupled with an attachment drive lug disposed on the eccentric drive at an upper end thereof and operably coupled at a lower end thereof with the support shaft of the bottom beater portion. The bottom beater portion may be driven by the drive shaft about an angled rotational axis that extends at an acute angle relative to the central axis of the mixing area.

Additional features of the foregoing aspect may include an articulating U-joint that operably couples the top mounting portion and the bottom beater portion and pivots about the offset rotational axis of the drive shaft and about the angled rotational axis.

A further aspect of present disclosure is an angled beater attachment for a stand mixer having a mixer operably coupled to a drive shaft of the stand mixer having an eccentric drive. The angled beater attachment may include a top mounting portion operably coupled to an offset drive shaft of the stand mixer, a bottom beater portion centrally disposed above the mixing area, and a beater support member operably coupled with the eccentric drive at an upper end thereof and operably coupled at a lower end thereof with a support shaft of the bottom beater portion. The drive shaft may drive the bottom beater portion about an angled rotational axis that extends at an acute angle relative to a central axis of a mixing area and causes the bottom beater portion to orbit the central axis.

Further features of the foregoing aspect may include the bottom beater portion defining a mixing element having a curvilinear leading edge adapted to engage a smooth curvature of the bottom interior surface of a mixing bowl and a trailing edge operably coupled with the leading edge, such that the leading edge and the trailing edge define a closed loop, and a bottom tail of the trailing edge may have a curvilinear configuration and extend away from the leading edge of the bottom beater portion and an upper arm of the leading edge extending outwardly from the support shaft of the bottom beater portion. The bottom beater portion may include a mixing element having a curvilinear leading edge, the leading edge further having a forward extending blade adapted to engage a smooth curvature of the bottom interior surface of a mixing bowl and a beater frame operably coupled with the leading edge, the beater frame having a forward leg, an upper leg operably coupled with the support shaft, a rearward leg, and a bottom leg that define a beater frame closed loop, and the leading edge and the beater frame defining a leading edge closed loop having an upwardly extending leg operably coupling an upper portion of the leading edge with the beater frame. A releasable connector may be disposed on the top mounting portion by which the top mounting portion is operably coupled to the drive shaft of the mixer, an articulating U-joint may pivot about the offset rotational axis of the drive shaft and about the angled rotational axis, the articulating U-joint being operably coupled with the releasable connecter of the top portion and the support shaft extending upwardly from the bottom beater portion; and the beater support member may be operably coupled with an attachment drive lug disposed on the eccentric drive at an upper end thereof and the beater support member may be operably coupled with the support shaft at a lower end thereof.

These and other features, advantages, and objects of the present disclosure will be further understood and appreciated by those skilled in the art by reference to the following specification, claims, and appended drawings.

Figure 1:
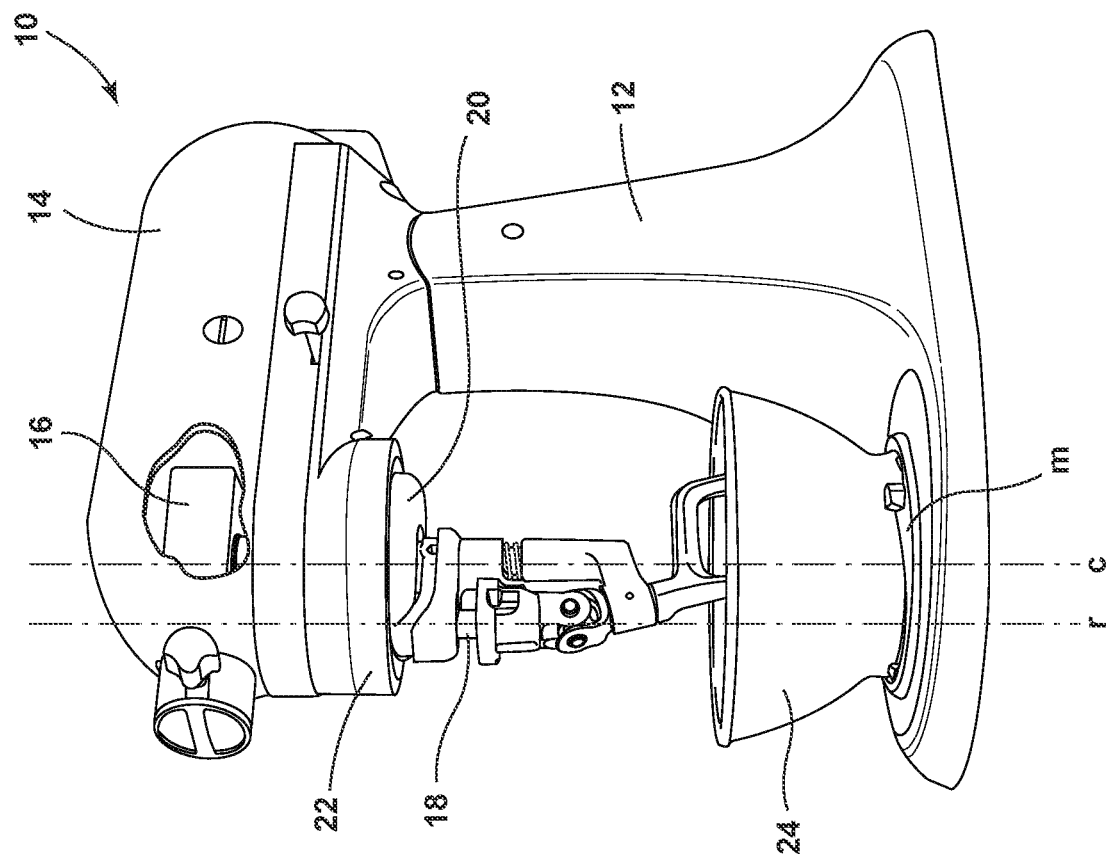
FIG. 1 is a perspective view of a stand mixer to which is operably coupled a first embodiment of the angled beater attachment according to the present disclosure disposed within a mixing bowl.

The components in the figures are not necessarily to scale, emphasis instead being placed upon illustrating the principles described herein.

DETAILED DESCRIPTION

The present illustrated embodiments reside primarily in combinations of method steps and apparatus components related to a mixer including an angled beater attachment having a bottom beater portion driven by a drive shaft about an angled rotational axis that extends at an acute angle relative to a central axis of the mixing area. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
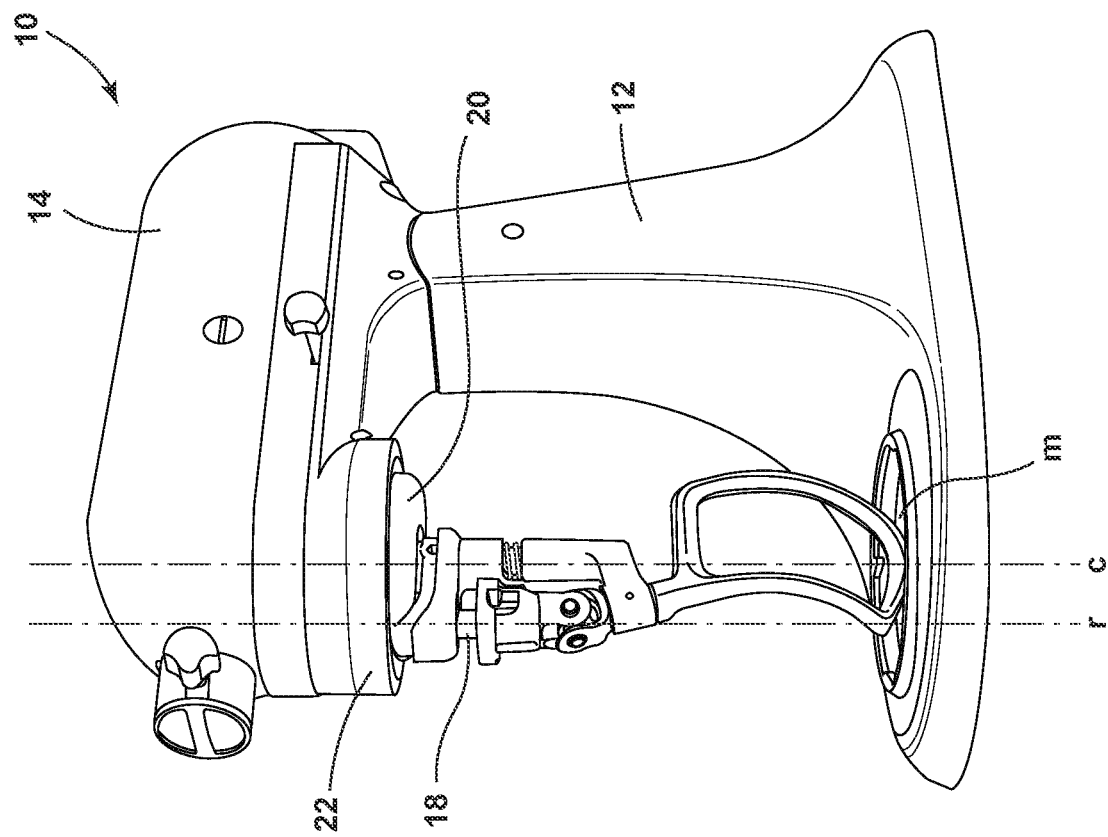
FIG. 2 is a perspective view of the stand mixer to which is operably coupled the first embodiment of the angled beater attachment according to the present disclosure shown in FIG. 1, with the mixing bowl removed.
Figure 3:
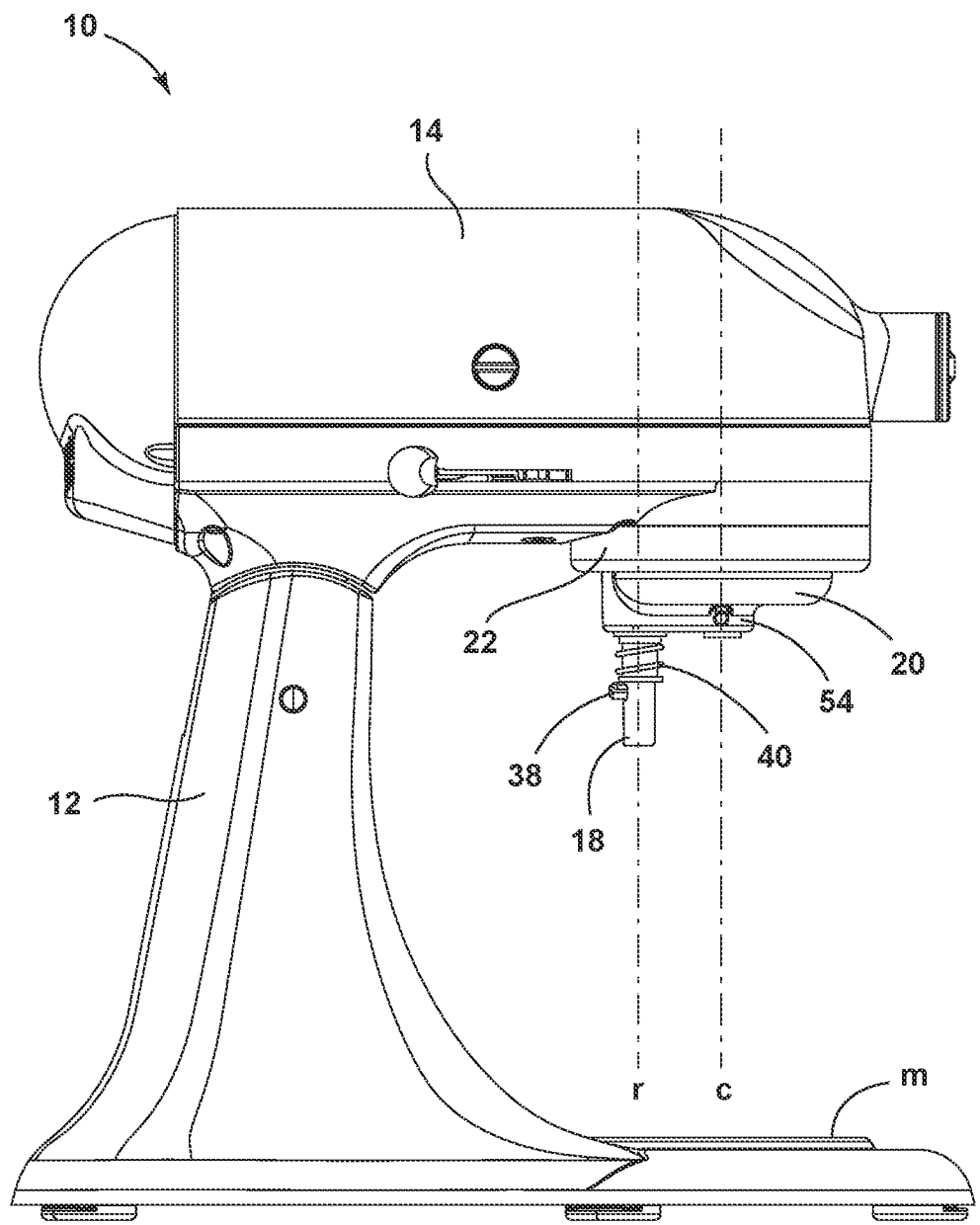
FIG. 3 is a side view of the stand mixer to which may be operably coupled the first embodiment of the dual whisk beater attachment according to the present disclosure shown in FIG. 1, with the dual whisk beater attachment removed.

With reference to the FIGS. 1-3, a stand mixer 10 includes a pedestal 12 and a mixing head 14. An electric motor 16 may is disposed within the mixing head 14 and may be configured to drive a drive shaft 18, as shown in FIG. 3. The drive shaft 18 may be mounted to an eccentric drive 20 disposed on a forward bottom portion 22 of the mixing head 14. The eccentric drive 20 mounted on the mixing head 14 of the mixer 10 is also coupled with the electric motor 16 disposed within the mixing head 14 and may be configured to rotate around a central axis c of a mixing area m. The mixing area m generally coincides with area below a receptacle 24, such as a mixing bowl, within which the food constituents are mixed or combined into a homogeneous mass. The drive shaft 18, which may be offset from the central axis c, may be configured to rotate about an offset rotational axis r and orbit around the central axis c of the mixing area m as the eccentric drive 20 is rotated about the central axis c of the mixing area m.

An angled beater attachment 26 may be coupled to the mixing head 14 and employed to mix or combine food constituents into a homogeneous mass. The angled beater attachment 26 includes a top mounting portion 28 operably coupled to the drive shaft 18 of the stand mixer 10, a bottom beater portion 30 disposed above the mixing area m, and a beater support member 32 operably coupled with a support shaft 34 of the bottom beater portion 30. More particularly, the top mounting portion 28 is operably coupled to the drive shaft 18 of the stand mixer 10 by a releasable connector 36 disposed on the top mounting portion 28. The drive shaft 18 extends into and is received within the releasable connector 36. The releasable connector 36 thus operably couples the drive shaft 18 to the top mounting portion 28 and, by doing so, operably couples the drive shaft 18 to the angled beater attachment 26. The releasable connector 36 cooperates with a tab 38 and spring 40 mounted on the drive shaft 18, as may be seen in FIG. 3, where the tab 38 may engage a recess 42 on the releasable connector 36 to releasably couple the drive shaft 18 to the releasable connector 36, as is known.

As the drive shaft 18 rotates about the offset rotational axis r, the drive shaft 18 drives rotation of the top mounting portion 28 about the offset rotational axis r. The offset rotational axis r of the drive shaft 18 and the rotational axis of the top mounting portion 28 are coincident and the top mounting portion 28 rotates about the offset rotational axis r of the drive shaft 18. Additionally, as the drive shaft 18 orbits around the central axis c, the top mounting portion 28 also orbits around the central axis c of the mixing area m. The releasable connector 36 thus directly couples the drive shaft 18 with angled beater attachment 26.

An articulating U-joint 44 operably couples the top mounting portion 28 and the bottom beater portion 30 and pivots about both the offset rotational axis r of the drive shaft 18 and about an angled rotational axis a. In order to adequately transmit torque developed by the electric motor 16 and drive shaft 18, the U-joint 44 may include a Hookes joint with a pair of downwardly extending yoke ears 46 on the top mounting portion 28 and a pair of upwardly extending yoke ears 48 on the upwardly extending support shaft 34 of the bottom beater portion 30. A center block or cross-shaped piece 50 (sometimes referred to as a "spider") having four orthogonal pins 52 may be engaged by the pair of downwardly extending yoke ears 46 on each side of a first pair of opposed pins 52 and by the pair of upwardly extending yoke ears 48 on each side of a second pair of opposed pins 52, where the first and second pairs of opposed pins 52 are orthogonal to each other.

Figure 6:
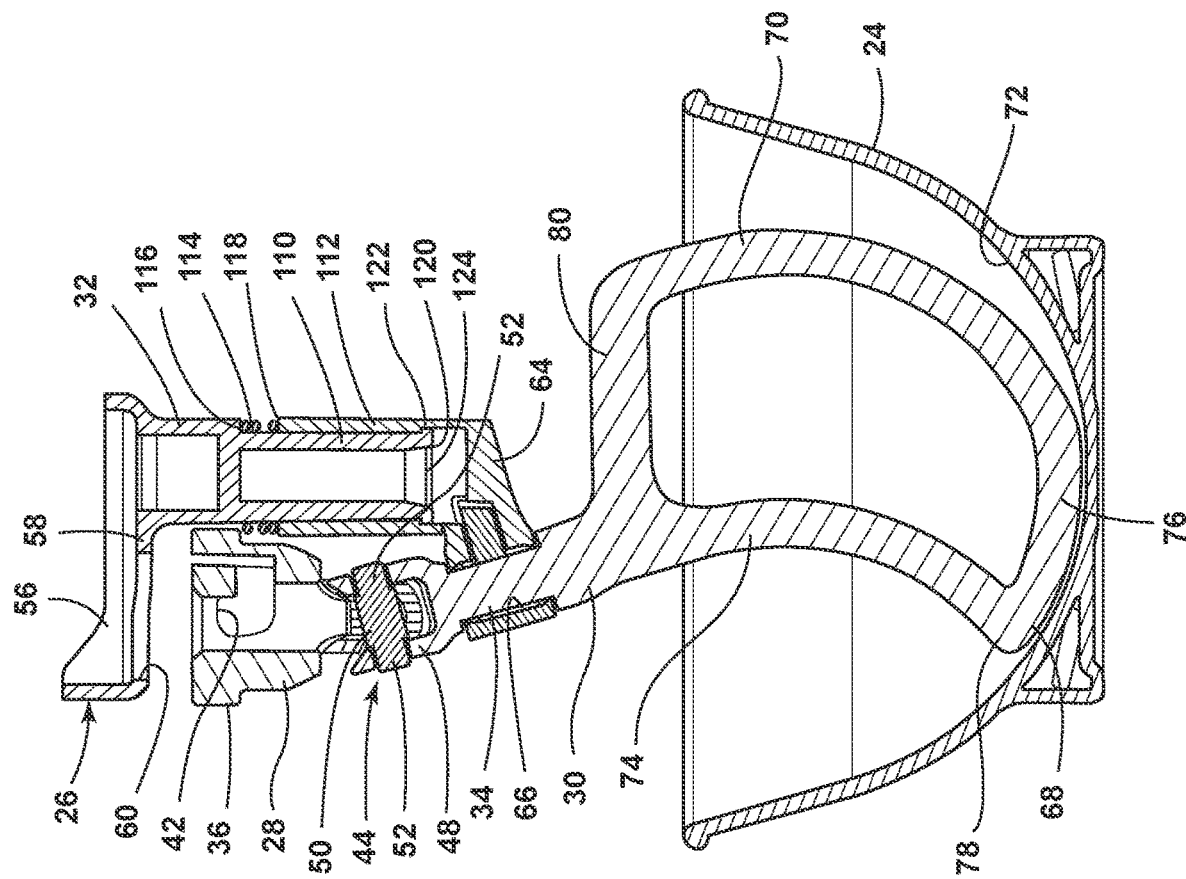
FIG. 6 is a cross-sectional view of the first embodiment of the angled beater attachment according to the present disclosure shown in FIG. 1, taken along the line VI-VI in FIG. 4.

Thus, the bottom beater portion 30 may be driven by the drive shaft 18 about an angled rotational axis a that extends at an acute angle α relative to the central axis c of the mixing area m, as shown in FIG. 6. That is, the drive shaft 18 is configured to rotate the bottom beater portion 30 about the angled rotational axis a, which is angled at an angle α relative to the offset rotational axis r of the drive shaft 18, as well as the center line c of the mixing area m. The acute angle α is defined between the center line c and the angled rotational axis a and may be between 10 and 30 degrees, and, optimally, at 20 degrees to promote mixing, reduce splashing, and improve packaging. The bottom beater portion 30 thus oriented may be positioned at a center of the mixing bowl 24 disposed above the mixing area m and may be configured to engage a center of the mixing bowl 24, as shown in FIG. 6 and further discussed below.

The beater support member 32 may be also coupled with the mixing head 14. That is, the beater support member 32 may be operably coupled with an attachment drive lug 54 disposed on the eccentric drive 20, which is adapted to engage a mating recess 56 at an upper end 58 of the beater support member 32 and thereby rotate the beater support member 32 and the angled beater attachment 26 around the central axis c of the mixing area m. The beater support member 32 may include an aperture 60 through which the drive shaft 18 extends to engage the releasable connector 36, as described above.

Figure 8:
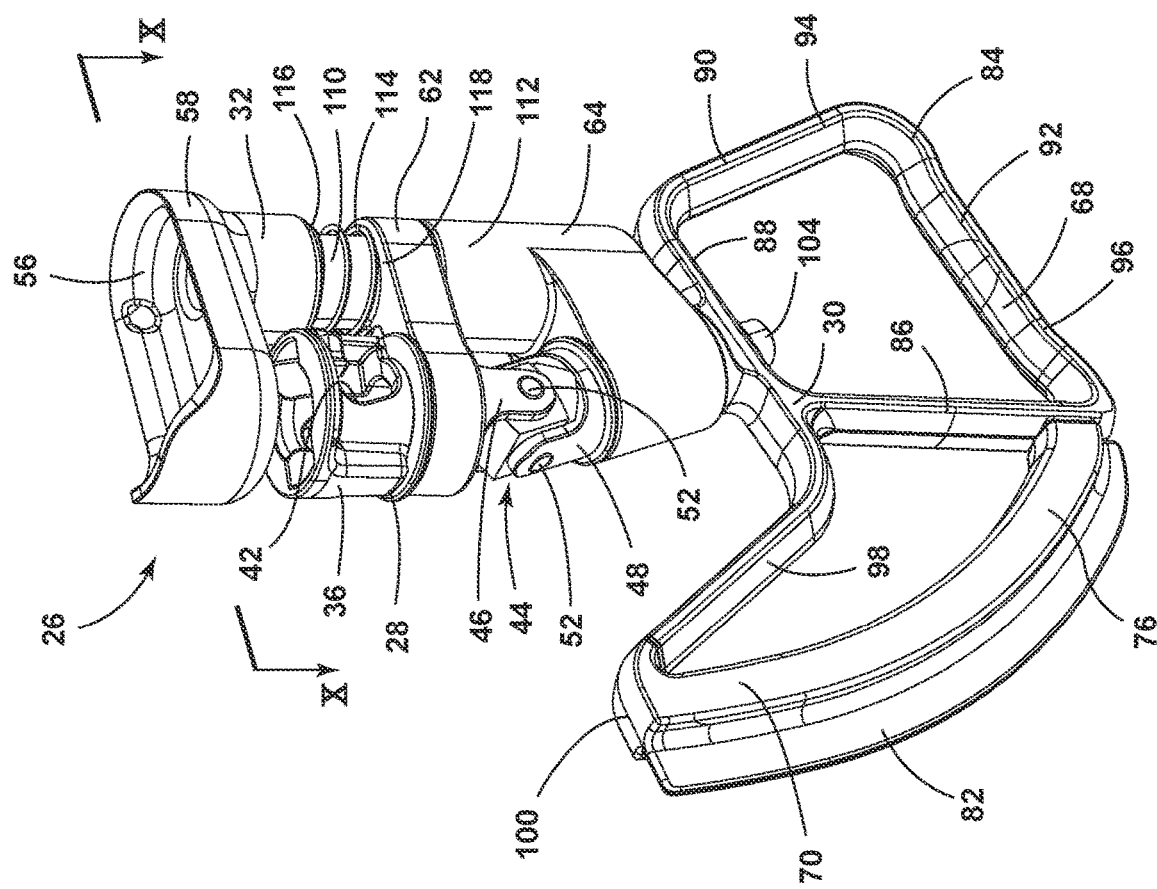
FIG. 8 is a perspective view of a second embodiment of the angled beater attachment according to the present disclosure.
Figure 9:
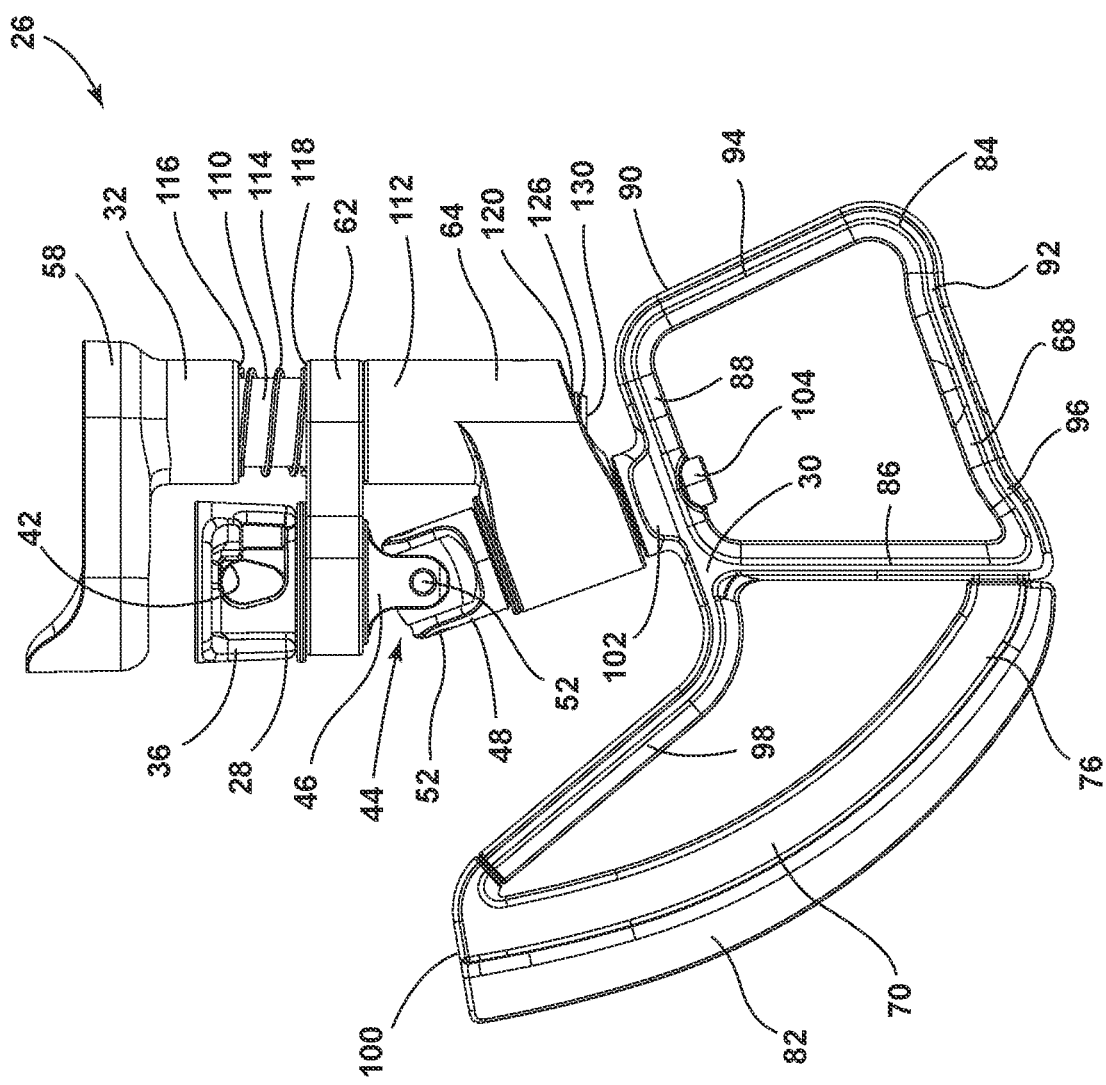
FIG. 9 is a side view of the second embodiment of the angled beater attachment according to the present disclosure shown in FIG. 8.
Figure 10:
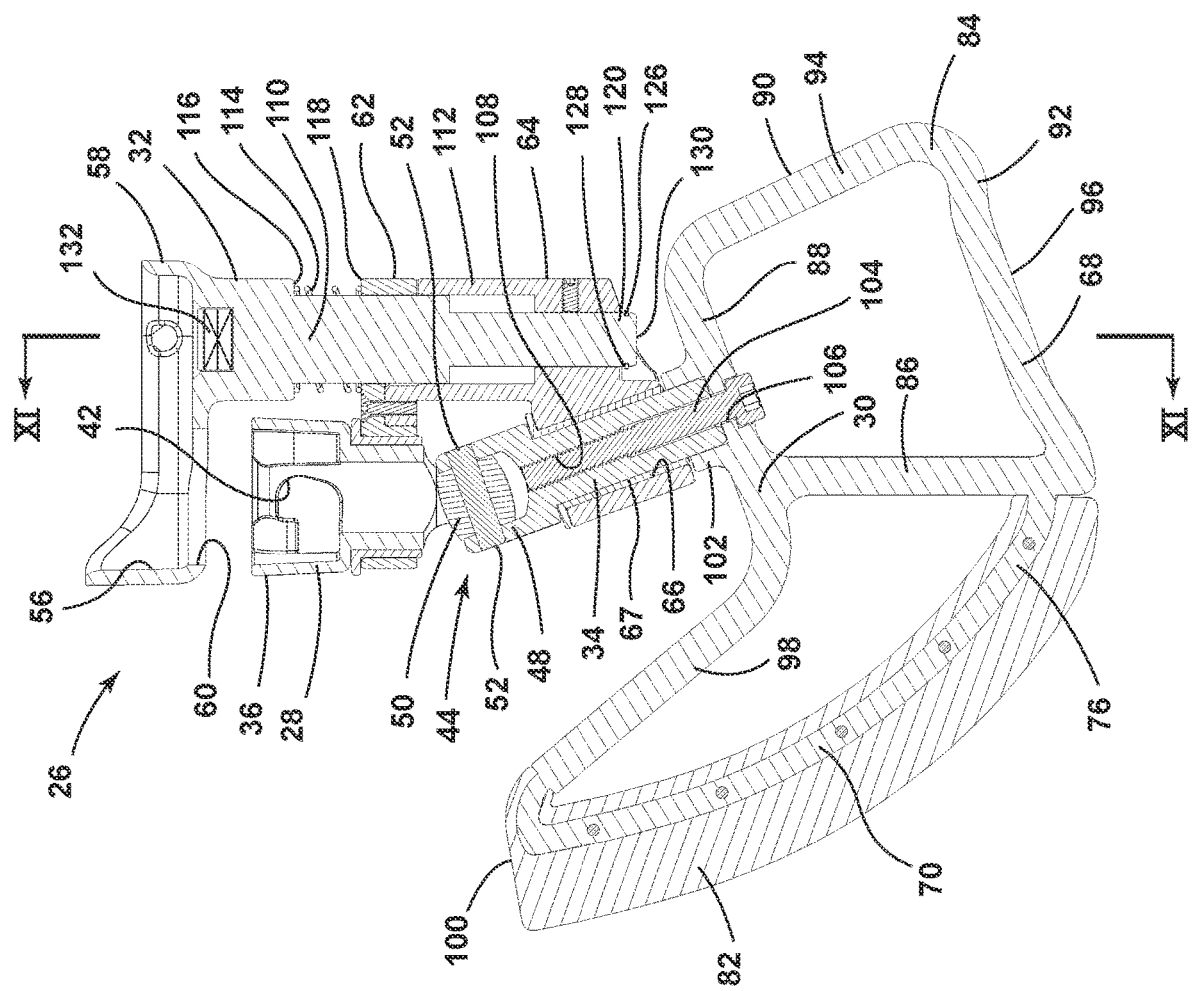
FIG. 10 is a cross-sectional view of the second embodiment of the angled beater attachment according to the present disclosure shown in FIG. 8, taken along the line X-X in FIG. 8.

The beater support member 32 also may be operably coupled with the support shaft 34 of the bottom beater portion 30 at a lower end 64 of the beater support member 32. The support shaft 34 may be rotatably mounted within an axial cavity 66 extending through the lower end 64 of the beater support member 32. The bottom beater portion 30 may thereby be fixed in relative position with the top mounting portion 28, but capable of rotating relative to the beater support member 32. Optionally, as an additional stabilizing feature, a collar 62 may be provided to fixedly couple the top mounting portion 28 and the beater support member 32, as shown in FIGS. 8-10. Further, an optional bearing surface 67 may be provided within the axial cavity 66, as shown in FIG. 10, to reduce wear.

Figure 4:
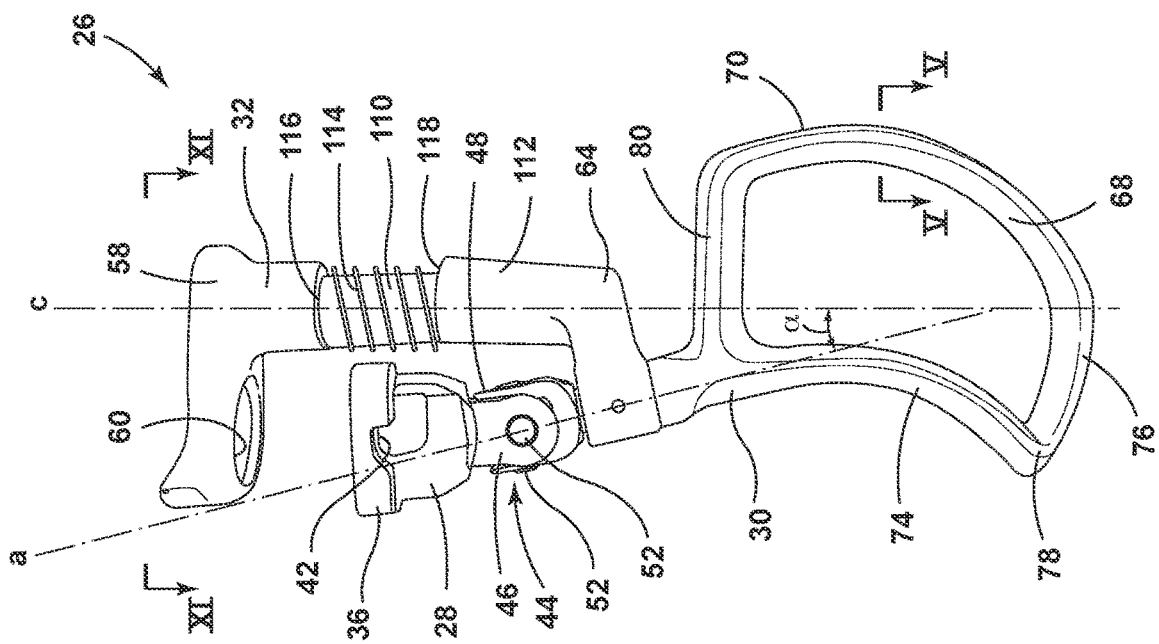
FIG. 4 is a side view of the first embodiment of the angled beater attachment according to the present disclosure shown in FIG. 1.
Figure 7:
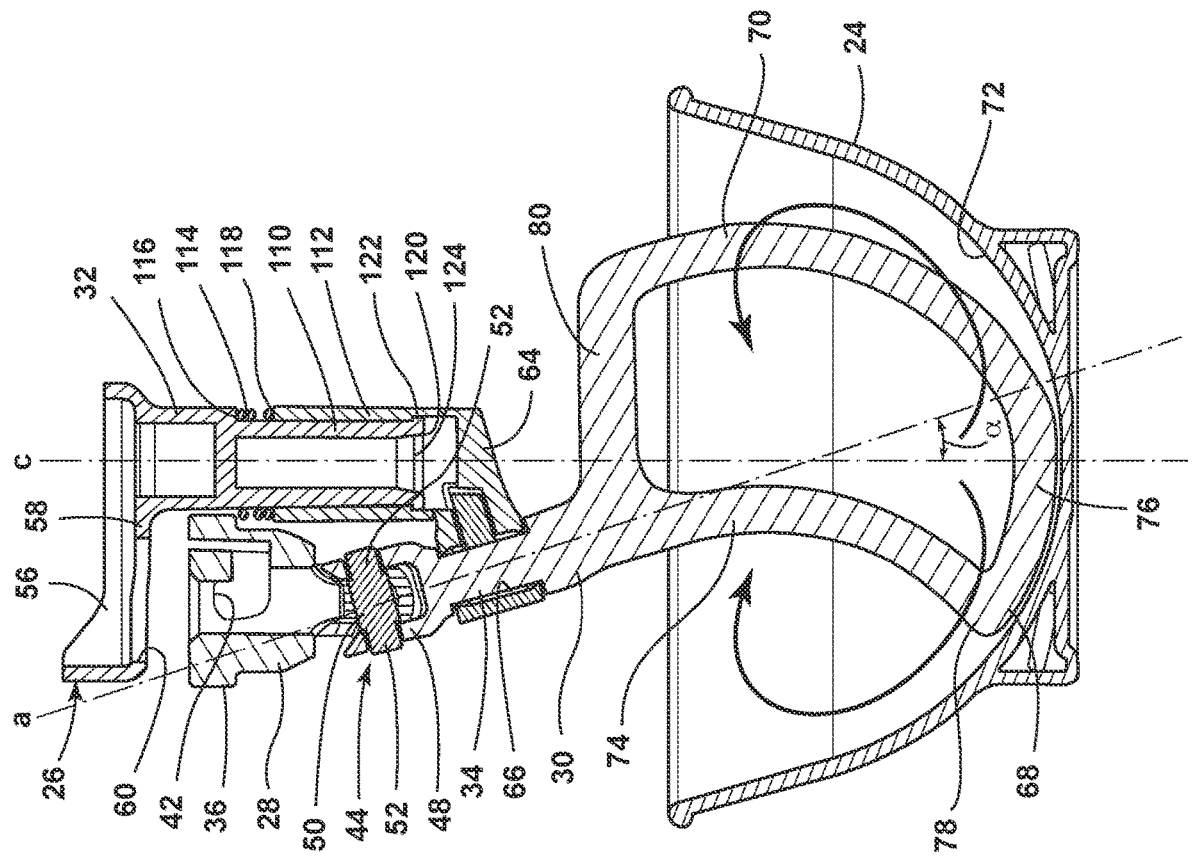
FIG. 7 is a cross-sectional view of the first embodiment of the angled beater attachment according to the present disclosure shown in FIG. 1, taken along the line VI-VI in FIG. 4, situated within a mixing bowl.

As shown in FIGS. 4, 6, and 7, a first embodiment of the angled beater attachment 26 is depicted. The bottom beater portion 30 may include a mixing element 68 having a curvilinear leading edge 70 adapted to engage a smooth curvature of 72 of the mixing bowl 24. The bottom beater portion 30 may also include a trailing edge 74 operably coupled with the leading edge 70, such that the leading edge 70 and the trailing edge 74 define a leading edge closed loop 76.

A bottom tail 78 of the trailing edge 74 may have a curvilinear configuration and extend away from the leading edge 70 of the bottom beater portion 30. An upper arm 80 of the leading edge 70 may extend outwardly from the support shaft 34 of the bottom beater portion 30. The leading edge closed loop 76 may have a substantially triangular cross-section, as shown in FIG. 5.

Alternatively, or in addition to, a second embodiment of the angled beater attachment 26 is depicted in FIGS. 8-11. In the second embodiment, the bottom beater portion 30 likewise may include a mixing element 68 having a curvilinear leading edge 70, but the leading edge 70 may also include a forward extending blade 82 adapted to engage the smooth curvature of the bottom interior surface 72 of the mixing bowl 24.

The bottom beater portion 30 may further include a beater frame 84 operably coupled with the leading edge 70. The beater frame 84 may include a forward leg 86, an upper leg 88 operably coupled with the support shaft 34, a rearward leg 90, and a bottom leg 92 that define a beater frame closed loop 94, likewise having a substantially triangular cross-section, as shown in FIG. 5. In order to accommodate the raised dimple often found in mixing bowls, the bottom leg 92 of the beater frame 84 may have an offset raised central portion 96.

Figure 5:
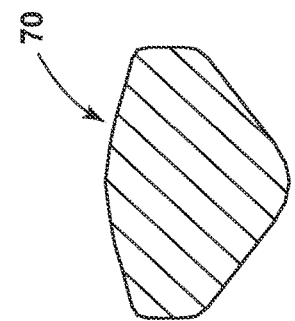
FIG. 5 is cross-sectional view of the trailing edge of the bottom beater portion of the first embodiment of the angled beater attachment according to the present disclosure shown in FIG. 1, taken along the line V-V in FIG. 4.

The leading edge 70 and the forward leg 86 of the beater frame 84 may define a leading edge closed loop 76 having an upwardly extending leg 98 operably coupling an upper portion 100 of the leading edge 70 with the beater frame 84, the upwardly extending leg 98 also having a substantially triangular cross-section, as shown in FIG. 5.

As shown in FIG. 10, the support shaft 34 of the bottom beater portion 30 may be fabricated as a separate component that is received with a boss 102 provided on the upper leg 88 of the beater frame 84. A threaded fastener 104 may extend through an opening 106 at the base of the boss 102 and may then be threaded into a threaded hole 108 provided along the longitudinal axis of the support shaft 34 to fixedly couple the support shaft 34 to the bottom beater portion 30.

Figure 11:
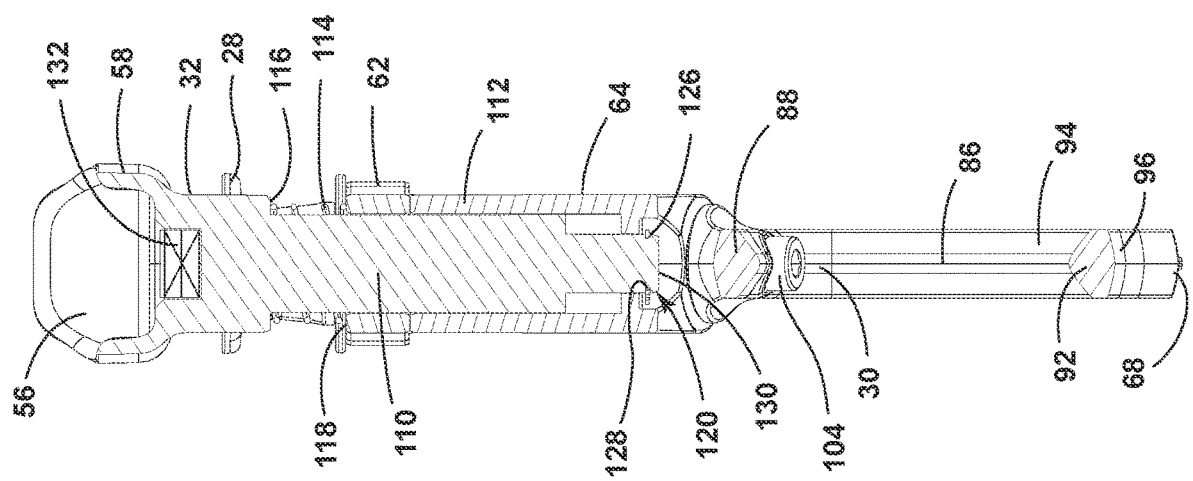
FIG. 11 is a cross-sectional view of the second embodiment of the angled beater attachment according to the present disclosure shown in FIG. 8, taken along the line XI-XI in FIG. 10.

The beater support member 32 may also be fabricated as separate components. The upper end 58 of the beater support member 32 may be a separate piece that is coupled with the mixing head 14, as described above. The lower end 64 of the beater support member 32 may be adapted to restrain the support shaft 34, as described above. However, as shown in FIGS. 6, 7 and 10, a projection 110 extending downwardly from the upper end 58 may be adapted to slidingly engage a vertical sleeve 112 extending upwardly from the lower end 64 of the beater support member 32. A spring 114, restrained by upwardly by an upper spring stop 116 and downwardly by a lower spring stop 118, acts to urge the upper end 58 away from the lower end 64. A stop 120 formed at a base of the projection 110 retains the projection 110 within the sleeve 112. The stop 120 may be formed as a lip 122 on the projection 110 that engages a shoulder 124, as shown in FIGS. 6 and 7, or a C-clip 126 that engages a groove 128 on a projecting portion 130 the projection 110, as shown in FIGS. 10 and 11.

This arrangement allows the upper end 58 of the beater support member 32 to be telescopically received within the sleeve 112 as the releasable connector 36 on the top mounting portion 28 is mounted to the drive shaft 18 and creates a restorative force to urge and maintain the mating recess 56 in engagement with the attachment drive lug 54 disposed on the eccentric drive 20 after assembly. Optionally, as an alternative or in addition, the beater support member 32 may be operably coupled to the attachment drive lug 54 of the eccentric drive 20 by a magnet 132 disposed in the recess 56.

Thus, as described above, the top mounting portion 28 of the angled beater attachment 26 may be operably coupled to the eccentric drive 20 by the drive shaft 18, which is received within the releasable connector 36 of the top mounting portion 28. The beater support member 32 may also be rotationally and operably coupled to the attachment drive lug 54 disposed on the eccentric drive 20, which is adapted to engage the mating recess 56 in the beater support member 32 and thereby rotate the beater support member 32 and the angled beater attachment 26 around the central axis c of the mixing area m.

The bottom beater portion 30, driven by the drive shaft 18 about an angled rotational axis a that extends at an acute angle α relative to the central axis c of the mixing area m, as shown in FIG. 6, may be thus positioned at a center of a mixing bowl 24 disposed above the mixing area m and may be configured to engage the center of a mixing bowl 24, allowing the raised dimple often found in mixing bowls 24 to be removed from the mixing bowl 24. That is, due to conventional stand mixer 10 beaters rotating off-center, a protruding central dimple is required in the mixing bowl 24 that moves the food constituents contained therein into the beater's path. This dimple makes cleanup harder, as well as producing greater waste. Furthermore the conventional beater only mixes in two dimensions, making it inefficient at mixing food constituents into a homogeneous mass and mixing food constituents at the bottom of the mixing bowl 24 with food constituents at the top of the mixing bowl 24.

However, in accordance with the present disclosure, the mixing bowl 24 may have a smooth curvature at a bottom interior surface 72 thereof. As the bottom beater portion 30 is rotated, the drive shaft 18 also orbits the center axis c, which also allows the releasable connector 36 and, consequently, the bottom beater portion 30 to orbit. The bottom beater portion 30 thus orbits, rotates, and, due to the angled rotational axis a, provides for central mixing of the food constituents in the mixing bowl 24 in a vertical direction (e.g., pulls food constituents from the bottom to mix), providing mixing along three different planes, as shown in FIG. 7. Since the mixing allows the lowest point of the mixing element 68 to be at the center of the mixing bowl 24, as shown in FIG. 7, the off-axis three-dimensional mixing element 68 may effectively agitate the center of a concave mixing bowl 24 (e.g., without a dimple), while inducing another, vertical, dimension of mixing. It also provides easier cleanup and much better mixing.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mixer for combining food constituents into a homogeneous mass, the mixer comprising:
   an eccentric drive mounted on a mixing head of the mixer and configured to rotate around a central axis of a mixing area and rotate an offset rotational axis of an eccentric drive shaft in an orbit about the central axis of the mixing area and having an offset rotatable attachment drive lug through which the eccentric drive shaft extends; and
   an angled beater attachment further comprising:
      a top mounting portion operably coupled to the eccentric drive shaft;
      a bottom beater portion disposed above the mixing area; and a beater support member operably coupled with a support shaft of the bottom beater portion at a lower end of the beater support member and operably coupled with the attachment drive lug of the mixing head via a mating recess disposed at an upper end of the beater support member, wherein the beater support member is adapted to directly engage the attachment drive lug and thereby rotate the angled beater attachment around the central axis of the mixing area;

wherein the bottom beater portion is driven by the eccentric drive shaft about an angled rotational axis that extends at an acute angle relative to the central axis of the mixing area.

2. The mixer of claim 1, wherein the angled beater attachment further comprises an articulating U-joint that operably couples the top mounting portion and the bottom beater portion and pivots about the offset rotational axis of the eccentric drive shaft and about the angled rotational axis.

3. The mixer of claim 1, wherein:
the beater support member rotates about the central axis; and
the offset rotational axis of the eccentric drive shaft and a rotational axis of the top mounting portion are coincident and the top mounting portion rotates about the offset rotational axis of the eccentric drive shaft and orbits the central axis of the mixing area.

4. The mixer of claim 1, wherein the top mounting portion of the angled beater attachment also orbits the central axis.

5. The mixer of claim 4, wherein the top mounting portion is operably coupled to the eccentric drive shaft by a releasable connector disposed on the top mounting portion.

6. The mixer of claim 1, wherein the bottom beater portion comprises a mixing element having a curvilinear leading edge adapted to engage a smooth curvature of a bottom interior surface of a mixing bowl.

7. The mixer of claim 6, wherein the bottom beater portion further comprises a trailing edge operably coupled with the leading edge, such that the leading edge and the trailing edge define a leading edge closed loop having a substantially triangular cross section.

8. The mixer of claim 7, wherein a bottom tail of the trailing edge has a curvilinear configuration and extends away from the leading edge of the bottom beater portion.

9. The mixer of claim 8, wherein an upper arm of the leading edge extends outwardly from the support shaft of the bottom beater portion.

10. The mixer of claim 1, wherein the bottom beater portion comprises a mixing element having a curvilinear leading edge, the leading edge further comprising a forward extending blade adapted to engage a smooth curvature of a bottom interior surface of a mixing bowl.

11. The mixer of claim 10, wherein the bottom beater portion further comprises a beater frame operably coupled with the leading edge, the beater frame comprising a forward leg, an upper leg operably coupled with the top mounting portion, a rearward leg, and a bottom leg that define a beater frame closed loop having a substantially triangular cross section.

12. The mixer of claim 11, wherein the bottom leg of the beater frame has an offset raised central portion.

13. The mixer of claim 11, wherein the leading edge and the forward leg of the beater frame define a leading edge closed loop having an upwardly extending leg operably coupling an upper portion of the leading edge with the beater frame, the upwardly extending leg having a substantially triangular cross section.

14. An angled beater attachment for a stand mixer having an eccentric drive rotatable about a central axis of a mixing area, the angled beater attachment comprising:
a top mounting portion operably coupled to an offset drive shaft of the stand mixer;
a bottom beater portion centrally disposed above the mixing area, the bottom beater portion having an upwardly extending support shaft; and
a beater support member operably coupled with an offset rotatable attachment drive lug disposed on the eccentric drive at an upper end thereof and operably coupled at a lower end thereof with the support shaft of the bottom beater portion, wherein the beater support member is operably coupled with the attachment drive lug of a mixing head via a mating recess disposed at an upper end of the beater support member, and wherein the beater support member is adapted to directly engage the attachment drive lug and thereby rotate the beater support member and the bottom beater portion around the central axis of the mixing area;
wherein the bottom beater portion is driven by the offset drive shaft about an angled rotational axis that extends at an acute angle relative to the central axis of the mixing area.

15. The angled beater attachment of claim 14, further comprising an articulating U-joint that operably couples the top mounting portion and the bottom beater portion and pivots about an offset rotational axis of the offset drive shaft and about the angled rotational axis.

16. An angled beater attachment for a stand mixer having a mixer operably coupled to an offset drive shaft of the stand mixer having an eccentric drive, the angled beater attachment comprising:
a top mounting portion operably coupled to the offset drive shaft of the stand mixer;
a bottom beater portion centrally disposed above a mixing area; and
a beater support member operably coupled with the eccentric drive at an upper end thereof and operably coupled at a lower end thereof with a support shaft of the bottom beater portion, wherein the beater support member is operably coupled with an offset rotatable attachment drive lug of a mixing head via a mating recess disposed at an upper end of the beater support member, and wherein the beater support member is adapted to directly engage the attachment drive lug and thereby rotate the beater support member and the bottom beater portion around the central axis of the mixing area;
wherein the offset drive shaft drives the bottom beater portion about an angled rotational axis that extends at an acute angle relative to a central axis of a mixing area and causes the bottom beater portion to orbit the central axis.

17. The angled beater attachment of claim 16, wherein:
the bottom beater portion defines a mixing element having a curvilinear leading edge adapted to engage a smooth curvature of a bottom interior surface of a mixing bowl and a trailing edge operably coupled with the leading edge, such that the leading edge and the trailing edge define a closed loop; and
a bottom tail of the trailing edge has a curvilinear configuration and extends away from the leading edge of the bottom beater portion and an upper arm of the leading edge extends outwardly from the support shaft of the bottom beater portion.

18. The angled beater attachment of claim 16, wherein:
the bottom beater portion comprises a mixing element having a curvilinear leading edge, the leading edge further comprising a forward extending blade adapted to engage a smooth curvature of a bottom interior surface of a mixing bowl and a beater frame operably coupled with the leading edge, the beater frame comprising a forward leg, an upper leg operably coupled with the support shaft, a rearward leg, and a bottom leg that define a beater frame closed loop; and the leading edge and the beater frame define a leading edge closed loop having an upwardly extending leg operably coupling an upper portion of the leading edge with the beater frame.

19. The angled beater attachment of claim 16, further comprising:
a releasable connector disposed on the top mounting portion by which the top mounting portion is operably coupled to the offset drive shaft of the mixer; and an articulating U-joint that pivots about an offset rotational axis of the offset drive shaft and about the angled rotational axis, the articulating U-joint being operably coupled with the releasable connector of the top mounting portion and the support shaft extending upwardly from the bottom beater portion; and wherein the beater support member is operably coupled with an attachment drive lug disposed on the eccentric drive at an upper end thereof and the beater support member is operably coupled with the support shaft at a lower end thereof.

\* \* \* \* \*